3,358,030
PROCESS FOR THE REARRANGEMENT OF EPOXIDES OF THE CYCLODODECANE SERIES
Günther Wilke and Peter Wilhelm Borner, Mülheim an der Ruhr, Germany, assignors to Studiengesellschaft Kohle m.b.H., a corporation of Germany
No Drawing. Filed Jan. 8, 1964, Ser. No. 336,343
Claims priority, application Germany, Mar. 31, 1958, St 13,598
9 Claims. (Cl. 260—586)

This invention relates to new and useful improvements in a process for the rearrangement of epoxides of the cyclododecane series. It is a continuation-in-part of U.S. application Ser. No. 800,970 dated Mar. 23, 1959, now abandoned.

U.S. application Ser. No. 730,339, now Patent No. 3,014,928, describes a process for the preparation of monoepoxides of cyclododecatrienes, in which cyclododecadiene monoepoxides are obtained in a substantially quantitative yield and with a high rate of conversion by oxidizing trans,trans,cis- or trans,trans,trans-cyclododecatri-(1,5,9)-enes with per compounds. The resulting 1,2-epoxy-cyclododecadi-(5,1)-enes can be hydrogenated to form 1,2-epoxy-cyclododecane or cyclododecanol. Cyclododecanol can be oxidized to form cyclododecanone. This can in turn be converted in known manner into its oxime and from the latter it is possible by Beckmann rearrangement, to obtain the lactam of omega aminododecanoic acid. The lactam can be polymerized to form a valuable highly water-repellent polyamide which can be used for the production of new synthetic fibers or other plastic materials.

According to the present invention, it is possible to simplify this synthesis substantially by a direct rearrangement of 1,2-epoxy-cyclododecadi-(5,9)-ene or 1,2-epoxy-cyclododecane to form the corresponding ketones. By using the process of the invention, it is possible to employ substantially simpler reaction conditions.

According to the invention, an epoxide of the cyclododecane series, and more especially 1,2-epoxy-cyclododecadi-(5,9)-ene or in particular 1,2-epoxy-cyclododecane, obtained therefrom by partial hydrogenation can be rearranged by subjecting it to a treatment in the presence of catalytic amounts and preferably from 0.1 to 10 mol percent, especially from 0.5 to 8 mol percent of magnesium halides with the exception of the fluorides, especially in the presence of magnesium bromide and magnesium iodide. The magnesium compounds used combine with electron donors such as ethers, epoxides and ketones to form complexes.

The process can be carried out very simply. The epoxide to be rearranged is heated with a catalytic amount of the metal compound which, for example, is dissolved in ether, and samples are taken at intervals, the course of the rearrangement being followed from these samples by infrared analysis of the ketone content. The rearrangement is preferably carried out without using a solvent, although it is possible to use a solvent. Preferably temperatures of between 50 and 200° C. are used. When the desired degree of conversion, or complete conversion, is reached, the product is either distilled off from the catalyst or diluted with a solvent, such as pentane, and freed from the catalyst by washing with water or acid. In both cases, when starting from 1,2-epoxy-cyclododecane, cyclododecanone having a purity corresponding to the theoretical melting point is immediately obtained without purification.

The action of the metal halides is based on the fact that while an ether complex of the metal halides is initially present, the latter, with displacement of the ether, is converted into a metal halide-epoxide complex, out of which the rearrangement is then brought about. The primary product of the rearrangement consists of a metal halide-ketone complex from which the ketone is displaced either by ether or epoxide. In this connection, it is to be observed that epoxides are also to be considered as ethers.

It is already known to rearrange middle position epoxides by means of metal salts. In such cases, at least equimolecular, and usually excess, quantities of the substances causing the rearrangement were employed. This known procedure has still not been proposed for the epoxides of the cyclododecane series. It is a completely surprising and technically important fact that it is possible, in accordance with the invention, to bring about a smooth rearrangement of the epoxides of the cyclododecane series to form the corresponding ketones using only catalytic quantities of the substances causing the rearrangement.

It has been pointed out above that the working conditions to be used in carrying out the process of the inventiona re extremely simple. Thus, the hydrogenation of 1,2-epoxy-cyclododecadi-(5,9)-ene to form 1,2-epoxy-cyclododecane can be effected at room temperature with very good yields, while the corresponding hydrogenation of the same starting material to form cyclododecanol can only be effected at temperatures exceeding 100° C. To effect the rearrangement according to the invention, it is only necessary to employ the simple and inexpensive particular magnesium halides in catalytic amounts, whereas considerable quantities of oxidizing agents are consumed when oxidizing cyclododecanol to cyclododecanone.

The following examples further illustrate the invention.

*Example 1*

To 250 g. (1.375 mol) of 1,2-epoxy-cyclododecane are added 200 cc. of an ethereal solution of magnesium bromide (20 g.=0.11 mole $MgBr_2$) and the mixture is then heated to 100° C. While heating, most of the ether distills off. Samples are taken after the time intervals indicated below and the ketone content thereof determined by infrared analysis.

| Reaction period in hours: | Percent ketone |
|---|---|
| 5 | 25.4 |
| 12 | 34.3 |
| 19 | 44.0 |
| 25 | 56.6 |
| 30 | 70.0 |
| 40 | 89.4 |

After 40 hours, the reaction is discontinued and the reaction product distilled off from the catalyst at about 1 mm. Hg. 196.2 g. of crystallizing distillate having a ketone content of 90% are obtained. In addition, there are six samples each of 4.5 g.=27 g., and also 29 g. of residue. The residue is taken up in pentane, washed free from magnesium bromide, and the solution dried. After filtering off the solvent with suction, another 12.4 g. of an epoxide/ketone mixture containing 47.5% of ketone are obtained. Thus, a total of 235 g. corresponding to 90% of the epoxide charged was recovered.

*Example 2*

40 g. of 1,2-epoxy-cyclododecane are heated with 15 cc. of an ethereal magnesium iodide solution (about 5 mol percent $MgI_2$/mol epoxide) for 20 hours at 70° C., some of the ether distilling off. Towards the end of this time, slight sublimation of the ketone is observed. The mixture is taken up in pentane and the solution is washed with water and with small amounts of thiosulfate solution to remove small amounts of precipitated iodine. After drying, the solvent is filtered off with suction. The residue crystallizes and consists of ketone with a purity corresponding almost to the theoretical melting point; M.P. 59–61° C. (M.P. of ultra-pure ketone, 61° C.). The conversion and the yield are thus quantitative. If only 0.5 mol percent of magnesium iodide is used as the catalyst, a ketone-epoxide mixture having a ketone content of 70% is obtained after heating for 16 hours at 110° C. and subsequent separation of the catalyst.

*Example 3*

50 g. of 1,2-epoxy-cyclododecane were heated, as in Example 2, with 5 mol percent of magnesium iodide for 17 hours at 70° C. Thereafter, 36 g. of the resulting ketone were distilled off under high vacuum, this ketone being obtained in substantially pure form (melting point 59–60° C.).

To the distillation residue which was solid after cooling and which contained the residual ketone and the catalyst, was added 36 g. of 1,2-epoxy-cyclododecane. A completely homogeneous solution was obtained, which was heated for 17 hours at 70° C. Thereafter, the catalyst was removed as in Example 2, and 50 g. of similarly substantially pure ketone having a melting point of 58–60° C. were obtained. In the two batches, using the same catalyst, a total of 86 g. of 1,2-epoxy-cyclododecane was quantitatively converted into substantially pure ketone.

*Example 4*

Example 1 is repeated except that about 5 mol percent of magnesium perchlorate are used as the catalyst. After heating for 40 hours at 100° C., a mixture which has a ketone content of 40% is obtained.

*Example 5*

40 g. of 1,2-epoxy-cyclododecadi-(5,9)-ene are heated in 15 cc. of ethereal $MgI_2$ solution (about 5 mol percent) for 70 hours at 70° C. The reaction product is then taken up in ether and the catalyst is washed out with water or with small amounts of thiosulfate solution, the solution is dried and the residue is distilled after removal of the solvent. A mixture consisting of 1,2-epoxy-cyclododecadi-(5,9)-ene and about 80% of cyclododecadienone distills over at 122° C./7 mm. Hg. The pure cyclododecadienone has a refractive index $n_D^{20}$ of 1.5063 and boils at 122° C./6 mm. Hg. The dinitrophenyl hydrazone of this ketone melts at 162° C.

What is claimed is:

1. Process for the rearrangement of an epoxide to form a corresponding ketone which comprises contacting a member selected from the group consisting of 1,2-epoxy cyclododecane and 1,2-epoxy cyclododecadi-(5,9)-ene, in the presence of a catalytic amount of a member selected from the group consisting of magnesium bromide, magnesium perchlorate and magnesium iodide at a temperature of up to 200° C. and recovering the ketone thereby formed.

2. Process as claimed in claim 1, wherein the ketone product formed is separated from the reaction mixture by diluting the reaction mixture with a solvent for the ketone product, which solvent is not miscible with water, and subsequently washing the solution to free it from the catalyst.

3. Process as claimed in claim 1, wherein said catalyst group member is anhydrous magnesium bromide.

4. Process as claimed in claim 1, wherein said catalyst group member is anhydrous magnesium iodide.

5. Process as claimed in claim 1, wherein said catalyst group member is used in an amount of from 0.1 to 10 mol percent.

6. Process as claimed in claim 5, wherein said catalyst group member is used in an amount of from 0.5 to 8 mol percent.

7. Process as claimed in claim 1, wherein said contacting is carried out in the presence of a solvent for the catalyst.

8. Process as claimed in claim 1, which comprises heating 1,2-epoxy-cyclododecane in the presence of a catalytic amount of magnesium halide which is present in the form of an ether complex to a temperature up to 200° C. and recovering the ketone formed thereby.

9. Process as claimed in claim 1, which comprises heating 1,2-epoxy-cyclododecadi-(5,9)-ene in the presence of a catalytic amount of said magnesium halide which is present in the form of an ether complex to a temperature up to 200° C. and recovering the ketone formed thereby.

References Cited

Stoll et al.: "Helv. Chem. Acta.," vol. 31, p. 1081 (1948).

LEON ZITVER, *Primary Examiner.*

M. JACOB, *Assistant Examiner.*